Figure 1:
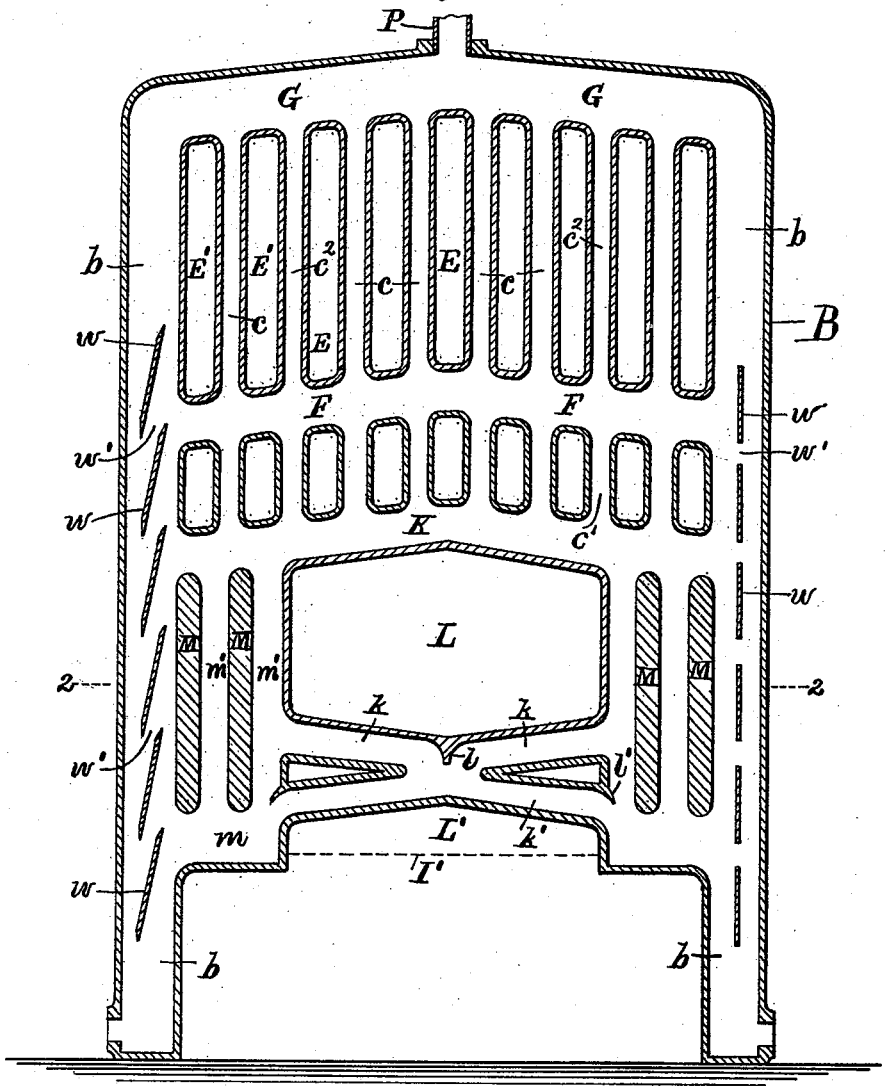

(No Model.)   4 Sheets—Sheet 1.

W. M. MACKAY.
STEAM OR HOT WATER BOILER.

No. 525,274.   Patented Aug. 28, 1894.

Attest:
L. Lee.
Edw. Pusey

Inventor.
William M. Mackay,
per Thos. S. Crane, atty.

(No Model.) 4 Sheets—Sheet 2.

W. M. MACKAY.
STEAM OR HOT WATER BOILER.

No. 525,274. Patented Aug. 28, 1894.

Attest:
L. Lee.
Edw. Kinsey.

Inventor.
William M. Mackay,
per Thos. S. Crane, Atty.

(No Model.) 4 Sheets—Sheet 3.
W. M. MACKAY.
STEAM OR HOT WATER BOILER.
No. 525,274. Patented Aug. 28, 1894.
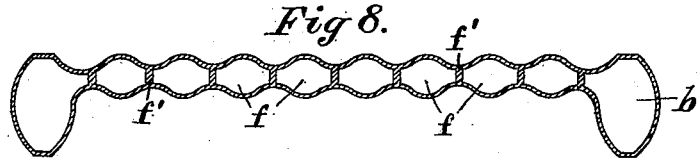
Fig. 8.
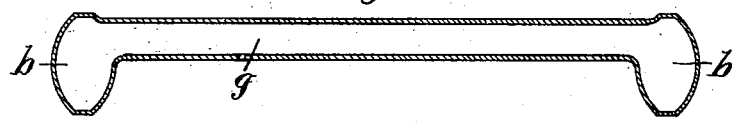
Fig. 9.
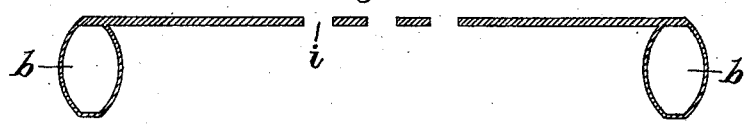
Fig. 10.
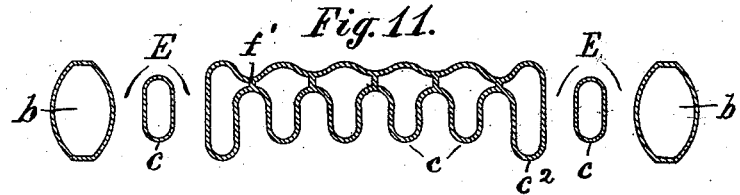
Fig. 11.
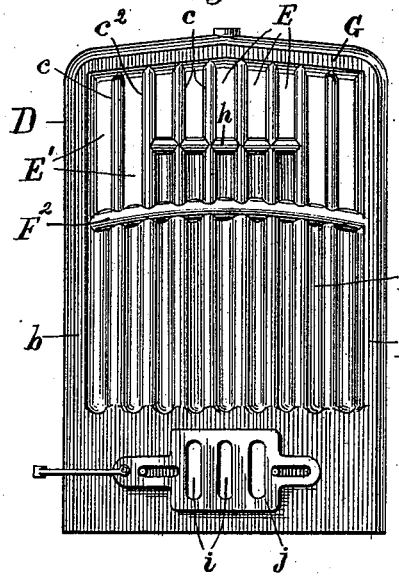
Fig. 7.
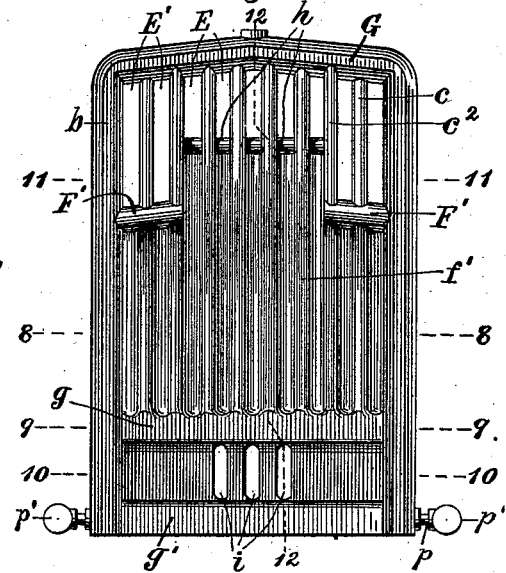
Fig. 7ª.
Attest:
L. Lee.
Edw. Kinsey.
Inventor
William M. Mackay,
per Thos. S. Crane, atty.

(No Model.) 4 Sheets—Sheet 4.
W. M. MACKAY.
STEAM OR HOT WATER BOILER.
No. 525,274. Patented Aug. 28, 1894.
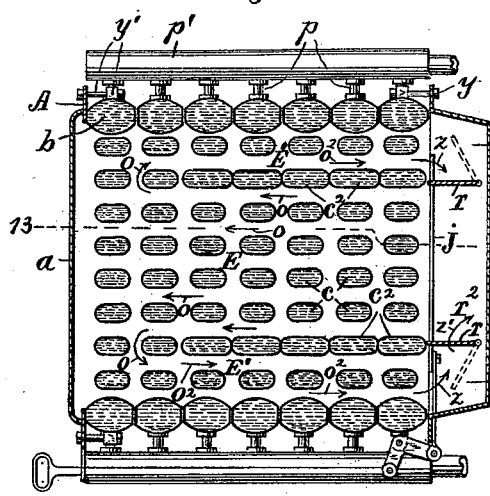
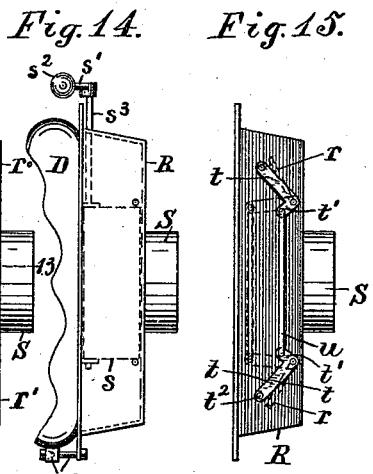
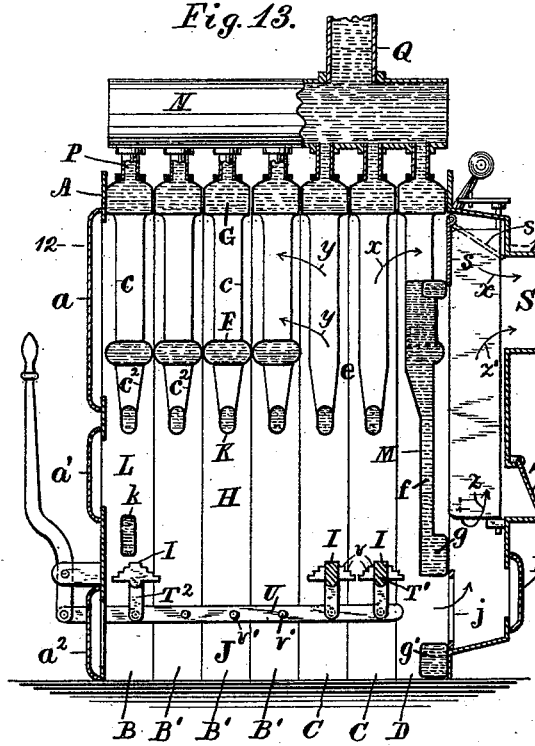
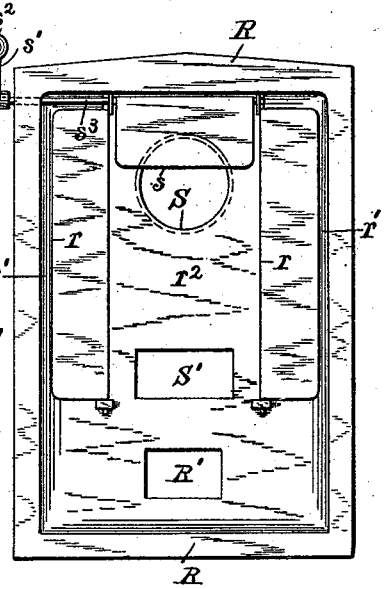
Attest:
L. Lee
Edw. Kinsey
Inventor.
William M. Mackay,
per Thomas S. Crane, Atty.

UNITED STATES PATENT OFFICE.

WILLIAM M. MACKAY, OF NEWARK, NEW JERSEY, ASSIGNOR TO HART & CROUSE, OF UTICA, NEW YORK.

STEAM OR HOT-WATER BOILER.

SPECIFICATION forming part of Letters Patent No. 525,274, dated August 28, 1894.

Application filed April 27, 1894. Serial No. 509,197. (No model.)

*To all whom it may concern:*

Be it known that I, WILLIAM M. MACKAY, a citizen of the United States, residing at Newark, Essex county, New Jersey, have invented certain new and useful Improvements in Steam or Hot-Water Boilers, fully described and represented in the following specification and the accompanying drawings, forming a part of the same.
This invention relates to that class of steam or hot water boilers in which is employed a series of flat vertical sections having water legs with intermediate fire space to form, with suitable grates, a fire box from which the gases are conducted to the smoke pipe through passages in or between the sections.

I have described the invention in connection with a series of seven sections including front and rear sections of special construction;
but flat plates may be used instead of special sections at the front and rear ends.

The general description of the sections relates to the intermediate sections which may be thus used, and which are shown in the annexed drawings formed with side water tubes connected at the top by a transverse water passage and at a lower level by a similar passage which I have termed the crown tube or arch, as it forms the crown of the fire box.
The operation of the construction is described as in a boiler for heating water, but the same construction may also be used for generating steam, in which case the upper portion of the section would be filled with steam instead of water. The sections are provided with intermediate vertical tubes connecting the crown tube or arch with the water arch at the top of the section, and the side tubes are carried downward in a direct line past the sides of the fire box to form the water legs. Extensions of the intermediate tubes are projected below the crown tube, and connected at their lower ends with a transverse water connection. The side tubes and the two arches are made of uniform thickness, while the intermediate tubes are in general made of less thickness so that the gases may circulate between the same and impart their heat to all sides of such tubes. Certain of the intermediate tubes adjacent to the side tubes are however, made of the same thickness as the section, so as to form three continuous passages beneath the water arch; the central passage forming a forward flue beneath the middle of the arch, and the passages in the upper corners of the section forming backward flues. The flues are provided with a lateral connection at their forward ends, which is formed by the passages between the intermediate tubes of the sections at the forward end. The crown arch is divided at the middle in the sections adjacent to the rear plate to form an uptake through which the gases enter the forward flue. The division of the crown arch distinguishes the sections between the front and rear plates into two series; the front series having the crown arch continuous between the side tubes, and the rear series having the crown arch divided with a suitable gap in the middle to form the uptake. The extensions of the intermediate tubes below the crown tube are preferably tapered downwardly, and the transverse water connection is made of greater depth than width to form at its sides smoke passages of greater thickness than such transverse connection. The front section may be made like the other sections or of a special construction in which reversely inclined tubes are connected to the water leg beneath the opening for the fuel door. A special construction is also shown for the rear section through which passages are provided beneath the water arch in communication with the forward and backward flues, and a corrugated plate extending downwardly from such passages to a cross tube at the level of the grates. The corrugated plate in such construction is formed with water passages which are connected with the water arch by intermediate vertical tubes.

These improvements with other details of construction which are described and claimed herein are shown in the annexed drawings, in which—

Figure 2:
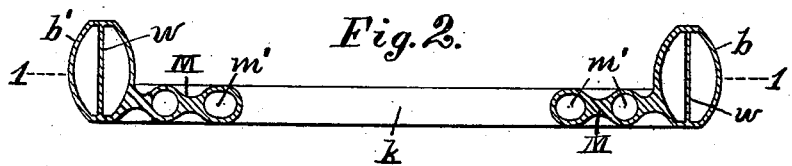
Figure 3:
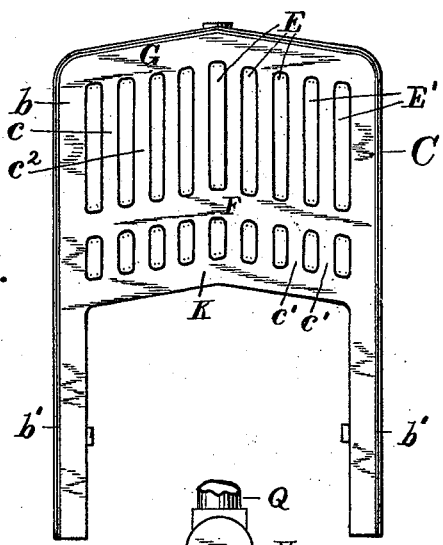
Figure 4:
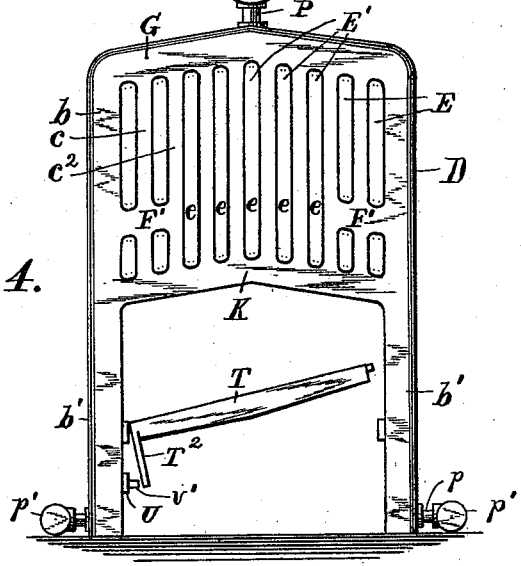
Figure 5:
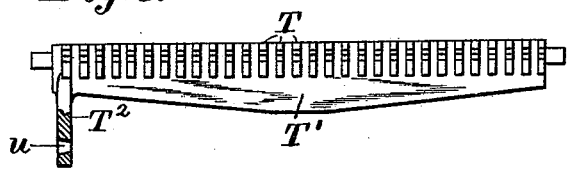
Figure 6:
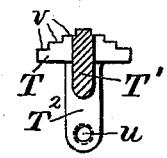

Figure 1 shows the front section cut open upon the line 1, 1, in Fig. 2. Fig. 2 is a section on line 2, 2, in Fig. 1. Fig. 3 is an elevation of one of the sections in the front series (that adjacent to the front section) having the continuous crown tube or arch. Fig. 4 is an elevation of one of the sections of the rear series, having the divided or discontinuous crown tube. Fig. 5 is a side view, and Fig. 6 an end view of one of the grate sections. Fig. 7 is an elevation of the special rear section upon its outer side. Fig. 7$^a$ is an elevation of the same upon its inner side. Fig. 8 is a transverse plan of the section upon the line 8, 8, in Fig. 7$^a$. Fig. 9 is a transverse plan upon the line 9, 9, in Fig. 7$^a$. Fig. 10 is a transverse plan on line 10, 10, in Fig. 7$^a$. Fig. 11 is a transverse plan on line 11 in Fig. 7$^a$. Fig. 12 is a horizontal section of the entire boiler on line 12, 12, in Fig. 13, which is a vertical section on line 13, 13, in Figs. 12 and 7$^a$. Fig. 14 is a plan of the smoke box and direct draft damper without the connections for adjusting the diving flue partitions. Fig. 15 is a similar plan showing the said connections. Fig. 16 is a side view of the smoke box.

In Figs. 12 and 13, A designates the boiler front, B designates the front section, B′ designates three other sections of the front series with continuous crown tube, C designates two sections of the rear series with divided crown tube, D designates the rear section, and R the smoke box.

F designates the continuous crown tube in the front series, and F′ the divided crown tube in the rear series.

G designates the water arch which connects the side tubes at the top of the section, and from the middle of which the flow pipe P is taken.

On the front A, $a$ designates a cleaning out door, $a'$ the fuel door, and $a^2$ the ash pit door.

H designates the space beneath the crown arch for the fire box, and the sections are shown with the water legs $b'$ extended below the level of the grate I to inclose the ash pit J.

Referring to the front section B in Figs. 1 and 2, $b$ designates the side tubes, connected horizontally by the arches F and G, and $c$ designates vertical intermediate tubes connecting the two arches.

$c^2$ designates the extensions of the intermediate tubes below the crown tube F, and K designates a transverse tube connecting the bottom ends of such extensions with the side tubes $b$. The extensions $c^2$ of the intermediate tubes are tapered downwardly, as shown in Fig. 13, to about one third the thickness of the entire section, and the transverse water connection K which unites their bottom ends is of the same thickness, thus leaving a space $d$ equal to two thirds the thickness of each section, between the transverse connections, in which the gases rise to the under sides of the crown tubes F. The sections B′ possess the features already described in connection with the section B; while the latter is also provided with a special construction around the opening $l$ for the fuel door, where $k$ and $k'$ designate reversely inclined tubes which connect the water legs; below the opening L for the fire door.

M designates a corrugated plate at the sides of the fire door with a short horizontal passage $m$ at the bottom leading inward to the water leg. Vertical passages $m'$ are formed in the corrugated plate between passage $m$ and the transverse connection K. The reversely inclined tubes $k, k'$, are united at the center and lead at their outer ends to the passages $m, m'$, with which they have a connection to the water leg and to the transverse connection K. A lug $l$ is projected downward at the middle of the upper inclined tubes $k$, and the lower tubes $k'$ are provided at their ends with lugs $l'$ inclined downwardly in the vertical passages $m'$. In the front section, as shown in Fig. 13, the crown arch F is of the same thickness as the section, from the front to the back of the same. The intermediate tubes where lettered $c$ in all the sections, are of less thickness (from front to back of the section) than the side tubes $b$, and certain of the tubes lettered $c^2$ (shown in Figs. 3, 4 and 12) are of the same thickness as the section to form partitions adapted to divide the space between the two arches into a central flue E, and two lateral flues E′. The crown tube in the sections C is divided as shown in Figs. 4 and 13 to form the uptake $e$, in which the gases rise through the spaces $d$ into the rear end of the central flue, and the flues have a lateral connection between the tubes $c$ at their forward ends.

The central flue E is supplied with the arrows $o$, the lateral connections with the arrow $o'$, and the backward flues which lie in the upper corners of the sections with the arrows $o^2$. The flow pipe P leads from each section just over the central flue, and is thus in the hottest part of the water arch. The sections are connected by their flow pipes with a drum N having its main outlet Q over the center of the uptake $e$, and as the heat of the furnace is concentrated in such uptake the outlet from the drum is nearest to the sections in which the water is the hottest.

The rear section D shown in Figs. 7 to 11 inclusive, is formed with the intermediate tubes $c, c^2$, like the rear series of sections; but the space between the water legs is closed below the flues E, E′, the central flue being made of less depth than in the other sections, as it is designed only as a direct draft outlet from the rear end of the forward flue. The lower ends of the intermediate tubes are extended downward through passages $f$ in a corrugated plate $f'$ to a cross tube $g$ near the level of the grate. The divided crown tube F′ is also formed upon the rear plate below the side flues, and operates, with the divided crown tube in the sections C, to deflect the gases inward to the uptake. A transverse passage $h$ connects the tubes $c^2$ in the rear plate to afford lateral circulation, and the lower ends of the water legs below the level of the grate are connected by a transverse water tube $g'$ which is united by external pipe connections $p$ and headers $p'$ with the lower ends of all the water legs; thus joining the opposite sides of the entire boiler at the bottom. A dust flue $i$ with damper $j$ is provided upon the rear section D between the tubes $g$ and $g'$, and the smoke box R is arranged to inclose such dust flue and the flues E, E', and provided near the top with a smoke outlet S. A damper $s$ is hinged in the smoke box to close the direct draft outlet, and has a horizontal pivot $s$ extended outside the smoke box and provided with an arm $s'$ having a weight $s^2$ at the end; the arm being suitably adjusted to throw the weight upon opposite sides of the pivot when the damper is open and closed. Movable partitions $r$ extend from the top of the smoke box downward, in a line with the tube $c^2$, thus dividing the smoke box into spaces connected at their lower ends, coincident with the flues E and E; the outer spaces $r'$ forming diving flues and the center space $r^2$ being in direct connection with the smoke outlet S. The partitions are hinged with vertical pivots projected outside of the smoke box, and having cranks $t$ and $t'$ upon their upper ends. The cranks are formed with eyes $t^2$ in their ends, and a link $u$ is formed with pins at the ends to fit such eyes. The cranks are so related to the partitions that when the link is applied to the cranks $t$ (as shown in dotted lines in Fig. 15) the partitions are held in their operative position as shown in full lines in Figs. 12 and 13. When the link is applied to the cranks $t'$ as shown in full lines in Fig. 15, it throws the partitions outwardly as shown in dotted lines in Figs. 12 and 15, and in full lines in Fig. 16, and renders them inoperative.

The smoke box is provided with a cleaning out door R' near the bottom and with a check draft S' below the smoke outlet S. The grates T shown in Fig. 4, are pivoted to sockets within the water legs, the right hand end of the grate being lifted from its socket in such figure to detach its arm from the raker bar U. The series of cross pieces T which form the top of the grate are formed with rectangular steps $v$, and are cast upon a longitudinal bar T' having an arm T² at one end formed, as shown in Fig. 5, with a hole $u$, the arm being projected nearly to the adjacent water leg. The raker bar U is formed with a series of pins $v'$ to fit loosely the holes upon the several arms, and is actuated by a handle V in the usual manner. The pins $v'$ are made tapering and are thus adapted to easily enter the holes $u$ when the grates are lowered from the inclined position shown in Fig. 4, to the level at which they operate. The bar U is held upon the pins upon one side by the arms T² and upon the opposite side by the water legs $b$.

It has been common heretofore to extend a division plate vertically, in the center of a side tube or water leg, to promote circulation within the same in opposite directions, as is induced by the greater heat to which the inner side of the leg is exposed by its proximity to the fire. The circulation in such leg is destroyed if the sections be used to generate steam, and the level of the water falls below the top of such division plate. To maintain the circulation within the side tubes under such conditions, I form the division plate in a vertical series of sections or portions $w$ having interspaces $w'$ through which the water may circulate at different levels. The separate portions of the division plate may be inclined as shown at the left side of Fig. 1, in which case their ends may be upon the same level, or vertically arranged as shown at the right side of the same figure, and of suitable length to leave the interspaces $w'$.

The operation of the entire device is as follows: The steps upon the grates prevent the slippage of clinkers when the grates are rocked and operate to crush the clinker much more effectively than where a curved surface with small notches is employed, as heretofore. The heated gases rising against the crown tubes F in the front series of sections heats the same most powerfully as well as the water in all of the transverse connections K which are hung by the extensions $c'$ directly in the flames above the fire, and the tapered sides of the extensions $c'$ intercept the direct rays of the fire much better than if vertical. The damper $s$ is opened when the fire is kindled as indicated by the dotted lines in Figs. 13 and 14, and the gases rising in the uptake then pass directly through the passage E in the section D to the smoke outlet S, as shown by arrows $x$. When the damper is closed as shown in full lines in Fig. 13, the gases rising in the uptake are driven forward through the flue E (as indicated by arrows $y$ in Fig. 13), passing thence at the forward end into the backward flues E' through the lateral connections indicated by the arrows $o$, and entering the diving flues $r'$. The gases pass thence beneath the ends of the partitions $r$ and escape by the smoke pipe S as indicated by the arrows $z, z'$, in Fig. 13. The passage of the gases down and upward at the sides of the partitions $r$ retains them in contact with the outer side of the rear section D, and thus utilizes to the fullest extent the heat in the gases. When the partitions $r$ which form the diving flues are swung outward as indicated in Fig. 16, they permit the gases to pass from the backward flues E' directly to the smoke pipe S, and they may be thus adjusted when the draft is insufficient to use a diving flue. Where the crown of the fire box has as heretofore been located adjacent to the rear section and the uptake for the gases formed in the front sections; it has been found that the rear sections were insufficiently heated; but the arrangement described secures a general distribution of the heat as the transverse connections K are fully exposed to the heat of the fire upon all of the sections, and the front sections are heated in the crown tube and also in the intermediate tubes above the same, by the movement of the heated gases through the return flues. The division plate formed with the interspaces $w'$ at different levels greatly facilitates the rise of the hot water or steam globules adjacent to the inner sides of the water tubes and water legs b, b', as a downward current is always induced in a certain portion of the tube and water leg, when the external circulation of the boiler is cut off and the heat causes the fluid over the hotter parts of the fire box to rise. Such rising fluid can only be replaced within the various passsages by the descent of fluid through the side tubes to the lower parts of the boiler, and the division plate w permits the upward and downward movement of fluid simultaneously in the side tubes and water legs; while it also maintains the circulation within such passages when the water level is lowered by any cause. The corrugated plates M and inclined cross tubes k, k', upon the front section operate very effectively to protect the fire door from the heat, while they also increase the strength of such section and augment the heating surface exposed thereby to the fire.

The boiler is easily constructed and very efficient in operation, and is adapted by the dampers and the constructive features of the smoke box to various conditions of the draft. Any number of sections may be used in constructing the boiler and the relative number of the sections B and C may be varied, as is found desirable.

It is obvious that the many features of the boiler may be utilized without extending the side tubes or water legs below the grate, and the sections may therefore be terminated at the level of the grate, and the boiler in such case be supported upon a suitable base having an ash pit therein. It is also obvious that the sections may be divided at the center into lateral halves; and connected separately to one or more steam or water drums, as such construction is already common, and would not affect the operation of the return flues, the divided crown arch, or the transverse water connections below the extensions c'. I do not therefore limit myself to the precise construction shown in the drawings.

The boiler front and the smoke box are shown projected at their edges beyond the intermediate sections and connected to the adjacent sections by bolts and lugs y'. These parts may serve to hold in place a non-conducting covering or jacket which in practice would be applied over the whole exterior of the boiler between such parts.

Having thus set forth the nature of the invention, what is claimed herein is—

1. In a steam or hot water boiler, a flat vertical section having side water tubes connected at the top by water arch and at a lower level by a crown tube or arch, the section being formed with intermediate vertical tubes, and extensions of the same below the crown tube with a transverse water connection at their lower ends, substantially as herein set forth.

2. In a steam or hot water boiler, a flat vertical section having side water tubes connected at the top by a water arch and at a lower level by a crown tube or arch, the section being formed with intermediate vertical tubes of less thickness than the arches, and extensions of the same tapered downwardly below the crown tube with a transverse water connection at their lower ends, substantially as herein set forth.

3. In a steam or hot water boiler composed of flat vertical sections, a front section having side water tubes connected by the water arch G and crown tube or arch F as set forth, vertical tubes connecting the two arches, and the reversely inclined tubes k, k' connecting the side tubes beneath the opening for the fuel door, as herein set forth.

4. In a steam or hot water boiler composed of flat vertical sections, a front section having side water tubes connected by the water arch G and crown tube or arch F as set forth, vertical tubes connecting the two arches and the reversely inclined tubes k, k' connecting the side tubes beneath the opening for the fuel door, and provided with the central lug l, as herein set forth.

5. In a steam or hot water boiler composed of flat vertical sections, a front section having side water tubes connected by the water arch G and crown tube or arch F as set forth, vertical tubes connecting the two arches, and the reversely inclined tubes k, k' connecting the side tubes beneath the opening for the fuel door, and the lower inclined tubes being provided at their ends with the downwardly inclined lugs l', as herein set forth.

6. In a steam or hot water boiler composed of flat vertical sections, a front section having side water tubes connected by the water arch G and crown arch F as set forth, vertical tubes connecting the two arches, and the reversely inclined tubes k, k' connecting the side tubes beneath the opening for the fuel door, and provided with the central lug l in the upper inclined tubes, and the lugs l' curved downwardly from the outer ends of the lower tubes, as herein set forth.

7. In a steam or hot water boiler composed of flat vertical sections, a front section having side water tubes connected by the water arch G and crown arch F as set forth, intermediate tubes of less thickness than the arches, and extensions of the same below the crown tube with a transverse water connection at their lower ends, the auxiliary tubes uniting such transverse connection with the side tube adjacent to the fuel door, and the reversely inclined tubes k, k', connecting the auxiliary tubes m', as herein set forth.

8. In a steam or hot water boiler composed of flat vertical sections, a rear section having side water tubes with water arch at the top, a cross tube near the level of the grate, the corrugated plate extended upwardly from the cross tube with the water passages f connected to such tube, and the vertical tubes c connecting such passages with the top arch, substantially as herein set forth.

9. In a steam or hot water boiler composed of flat vertical sections, a rear section having side water tubes with water arch at the top, a cross tube near the level of the grate, the corrugated plate extended upwardly from the cross tube with the water passages $f$ connected to such tube, and the vertical tubes $c$ of greater thickness and less width than the passages, connecting such passages with the water arch, substantially as herein set forth.

10. In a steam or hot water boiler composed of flat vertical sections, a rear section having side water tubes with water arch at the top, a cross tube near the level of the grate, a corrugated plate extended upwardly from the cross tube with the water passages $f$ connected to such tube, the vertical tubes $c$ connecting such passages with the top arch, the apertures E and E' forming flues between the tubes, and the water tubes or partitions $c^2$ inclosing the apertures E', as herein set forth.

11. In a steam or hot water boiler composed of flat vertical sections, a rear section having side water tubes with water arch at the top, a cross tube near the level of the grate, a corrugated plate extended upwardly from the cross tube with the water passages $f$ connected to such tube, the vertical tubes $c$ connecting such passages with the top arch, the apertures E and E' forming flues between the tubes, the transverse water passages $h$ and $F^2$ connecting the tubes and corrugations upon the outer side of the section, and the water tubes or partitions $c^2$ inclosing the apertures F', as herein set forth.

12. In a steam or hot water boiler comprising a front and rear section with intermediate sections, the section forming an uptake adjacent to the rear and having side water tubes connected by a water arch G at the top, with a divided crown tube F' attached to the side tubes, a transverse water connection below such crown tube with intermediate tubes connecting the same to the top arch, the divided crown tube and two of the intermediate tubes forming return flues in the upper corners of the section, and the transverse water connection having smoke passages at its sides of greater thickness than such transverse connection, as herein set forth.

13. In a steam or hot water boiler, a flat vertical section having side water tubes connected at the top by water arch, and having over the fire box space a transverse connection of greater height than width with smoke passages at its sides of greater thickness than such connection, and a series of intermediate tubes of less thickness than the section and greater thickness than the transverse connection extended from the water arch down to such connection, the lower portions of such tubes being tapered toward the water connection and thus exposing the inclined surfaces to the radiant heat, as herein set forth.

14. In a steam or hot water boiler, a flat vertical section having side water tubes connected at the top by a water arch, and having over the fire box space a transverse connection of greater height than width with smoke passages at its sides of greater thickness than such connection, and a series of intermediate tubes of less thickness than the section and greater thickness than the transverse connection extended from the water arch down to such connection, a divided crown arch extended from the side tubes across a portion of the intermediate tubes, and such crown arch and such intermediate tubes being of the same thickness as the section to form return flues in its upper corners, substantially as herein set forth.

15. In a sectional steam or hot water boiler, the combination, of two series of flat vertical sections having side tubes connected at the top by a water arch and at a lower point by a crown tube, with intermediate tubes between such side tubes, the front series of sections having the crown tube extended across the entire section to wholly intercept the smoke or gases, and the rear series having the crown tube constructed to permit the upward movement of the gases, and the intermediate tubes adjacent to the side tubes being formed of suitable thickness in the various sections to form a forward flue through the middle of the front series and a backward flue through the sides of both rear series, with lateral connection between such flues at their forward ends, substantially as herein set forth.

16. In a sectional steam boiler, the combination of two series of flat vertical sections having side tubes connected at the top by a water arch and at a lower point by a crown tube, with intermediate tubes between such side tubes and extensions of such intermediate tubes below the crown tube with a transverse water connection at their lower ends, the front series of sections having the crown tube extended across the entire section and arranged to wholly intercept the rising smoke or gases, and the rear series having the crown tube divided to permit the upward movement of the gases, the intermediate tubes adjacent to the side tubes being formed of suitable thickness in the various sections to form forward and backward return flues with lateral connection between such flues at their forward ends, substantially as herein set forth.

17. In a sectional steam boiler, the combination of two series of flat vertical sections having side tubes connected at the top by a water arch and at a lower point by a crown tube, with intermediate tubes between such side tubes and extensions of such intermediate tubes below the crown tube with a transverse water connection at their lower ends, the front series of sections having the crown tube extended across the entire section and arranged to wholly intercept the rising smoke or gases, and the rear series having the crown tube divided to permit the upward movement of the gases, the outside rear section having vertical passages therein connected by tubes to the water arch, a cross tube connecting the bottoms of such passages with the side tubes, and the intermediate tubes adjacent to the side tubes being formed of suitable thickness in the various sections to form a forward flue through the middle of the front series and a backward flue through the sides of both series with lateral connection between such flues at their forward ends, substantially as herein set forth.

18. In a boiler comprising a series of flat vertical sections, the combination, with sections having a water arch at the top, with forward and backward flues extending beneath such arch, and a direct draft outlet from the rear end of the forward flue, of a suitable front with fuel door, and the smoke box R covering the ends of such flues and provided with a smoke outlet and having the damper $s$ to close the direct draft outlet from the forward flue, the damper having horizontal pivot $s'$ extended outside of the smoke box and provided with the arm $s^2$ having weight $s^3$ adapted to hold the damper open or shut at pleasure, as set forth.

19. In a boiler comprising a series of flat vertical sections, the combination, with sections having a water arch at the top, with forward and backward flues extending beneath such arch, and a direct draft outlet from the rear end of the forward flue, of a suitable front with fuel door, and the smoke box R covering the rear ends of such flues and provided with a smoke outlet and a damper to close the direct draft outlet from the forward flue, and having the movable partitions $r$ between the outlets to the forward and backward flues to form diving flues within the smoke box, substantially as herein set forth.

20. In a boiler comprising a series of flat vertical sections, the combination, with sections having a water arch at the top, with forward and backward flues extending beneath such arch, and a direct draft outlet from the rear end of the forward flue, of a suitable front with fuel door, and the smoke box R covering the rear ends of such flues and provided with a smoke outlet and a damper to close the direct draft outlet from the forward flue, and having the hinged partitions $r$ extended downward from the top of the smoke box between the outlets of the forward and backward flues, with means for holding the partitions in their operative position, substantially as herein set forth.

21. In a boiler comprising a series of flat vertical sections, the combination, with sections having a water arch at the top, with forward and backward flues extending beneath such arch, and a direct draft outlet from the rear end of the forward flue, of a suitable front with fuel door, and the smoke box R covering the rear ends of such flues and provided with a smoke outlet and a damper to close the direct draft outlet from the forward flue, and having the hinged partitions $r$ extended downward from the top of the smoke box with their pivots projected outside of the same, and provided with the cranks $t$, $t'$ and a link for holding the partitions in an operative position, as herein set forth.

22. In a boiler comprising a series of flat vertical sections, the combination, with sections having a water arch at the top, with forward and backward flues extending beneath such arch, and a direct draft outlet from the rear end of the forward flue, of a suitable front with fuel door, and the smoke box R covering the rear ends of such flues and provided with a smoke outlet and a damper to close the direct draft outlet from the forward flue, and having the hinged partitions $r$ extended downward from the top of the smoke box with their pivots projected outside of the same, and provided with the double cranks $t$, $t'$, and the link fitted detachably to the cranks and adapted to hold the partitions in their alternative positions, as herein set forth.

23. In a boiler comprising a series of flat vertical sections having a water arch at the top, with forward and backward smoke flues extending beneath such arch, and a direct draft outlet from the rear end of the forward flue, the combination with the other sections, of a rear section having the cross tube $g$ near the level of the grate, with corrugated plate $f'$ having passages $f$ connected with the water arch and having a dust flue opening and damper beneath the cross tube, and the smoke box R covering such dust flue and the rear ends of the smoke flues, and provided with a damper to close the direct draft outlet from the forward flue, the whole arranged and operated as herein set forth.

24. In a boiler comprising a series of flat vertical sections having a water arch at the top, with forward and backward flues extending beneath such arch, and a direct draft outlet from the rear end of the forward flue, the combination, with the other sections, of a rear section having the cross tube $g$ near the level of the grate, with corrugated plate $f'$ having passages $f$ connected with the water arch, and having a dust flue opening and damper beneath the cross tube, and the smoke box R covering such dust flue and the rear ends of the smoke flues, and provided with a damper to close the direct draft outlet from the forward flue, and with the cleaning out door R' and draft check S', the whole arranged and operated substantially as herein set forth.

25. In a boiler comprising a series of flat vertical sections having water legs at the sides of the fire box space, the combination of a series of such sections having the legs disconnected at the bottom, and a rear section having a cross tube near the level of the grate with the corrugated plate extended upwardly from the same and having water passages connected by vertical tubes with the top arch of the section, flue spaces between said water tubes, and a transverse water tube between the lower ends of the legs in such rear section with pipe connection between all the sections at their lower ends, as herein set forth.

26. In a sectional steam or water boiler, the combination of a series of flat vertical sections having a water arch at the top, a crown arch at a lower level, and intermediate tubes of suitable thickness to inclose a forward flue under the middle of the water arch and backward flues at the sides of the same, such sections having a lateral connection between the flues at their forward end, and an uptake at the back of the fire box into such forward flue with a drum connected to the top of each section over such forward flue, as herein set forth.

27. In a boiler comprising a series of flat vertical sections having a water arch at the top, with a crown arch at a lower level, and intermediate tubes of suitable thickness to inclose a forward flue under the middle of the water arch and backward flues at the sides of the same, the combustion, with such sections having an uptake at the back of the fire box into such forward flue, of a drum connected to the middle of each section at the top and having its outlet over such uptake, as herein set forth.

28. In a boiler comprising a series of flat vertical sections with water legs at the sides extended below the level of the grate, the combination, with such water legs having sockets for rocking grates, of grates having pivots fitted thereto, and having each the arm $T^2$ projected downwardly adjacent to one of the water legs, and formed with the holes $u$ projected nearly to such leg, and the raker bar U provided with means for reciprocating the same and having the series of pins $v$ fitted to the said holes, the whole arranged and operated substantially as herein set forth.

29. In a vertical section for steam or hot water boilers having side water tubes with suitable transverse connections, the combination, with such side tubes, of a division plate $w$ formed with interspaces $w'$ at different levels, as herein set forth.

30. In a vertical section for steam or hot water boilers having side water tubes with suitable transverse connections, the combination, with such side tubes, of a division plate formed in a vertical series of inclined sections or portions having interspaces $w'$ at their adjacent ends, as herein set forth.

In testimony whereof I have hereunto set my hand in the presence of two subscribing witnesses.

WILLIAM M. MACKAY.

Witnesses:
 THOMAS S. CRANE,
 L. LEE.